United States Patent [19]

Haselkorn

[11] Patent Number: 4,496,399

[45] Date of Patent: Jan. 29, 1985

[54] METHOD AND AQUEOUS COATING COMPOSITIONS FOR FORMING ANTI-STICK AND INSULATIVE COATINGS ON SEMI-PROCESSED AND FULLY-PROCESSED ELECTRICAL STEELS

[75] Inventor: Michael H. Haselkorn, Franklin, Ohio

[73] Assignee: Armco Inc., Middletown, Ohio

[21] Appl. No.: 612,741

[22] Filed: May 21, 1984

[51] Int. Cl.$^3$ .................................................. C23F 7/10
[52] U.S. Cl. .............................. 148/6.15 R; 148/113; 524/417
[58] Field of Search ................... 524/417; 148/6.15 R, 148/113

[56] References Cited

U.S. PATENT DOCUMENTS 3,908,066  9/1975  Parkinson ............................ 427/58

Primary Examiner—Sam Silverberg
Attorney, Agent, or Firm—Frost & Jacobs

[57] ABSTRACT

A method and aqueous coating composition for forming an anti-stick and insulative coating on cold-rolled, non-oriented, semi-processed steel; cold-rolled, non-oriented, fully-processed steel; cold-rolled motor lamination steel; and punching quality oriented electrical steel. The coating composition has an inorganic portion and an organic portion. The inorganic portion comprises, on a water-free basis and by weight, 3% to 11% $Al^{+++}$, 3% to 15% $Mg^{++}$ and 78% to 87% $H_2PO_4^-$ calculated as $Al_2O_3$, MgO and $H_3PO_4$, respectively, the total weight percentage being 100% on a water-free basis and the concentration being 100 parts by weight on a water-free basis; and either 33 to 250 parts by weight colloidal silica on a water-free basis, together with from 10 to 25 parts by weight chromic anhydride for every 100 parts by weight $H_2PO_4^-$ calculated as $H_3PO_4$, or from 30 to 250 parts by weight aluminum silicate calculated as $Al_2O_3.SiO_2$ on a water-free basis. The inorganic portion contains by weight at least 60% water when colloidal silica is used and at least 40% water when aluminum silicate is used. The organic portion comprises a water soluble or dispersible resin containing by weight at least 40% water. The inorganic and organic portions are combined so that the organic content is from about 15 to about 1350 parts by weight per 100 parts $Al_2O_3$, MgO and $H_3PO_4$ on a water-free basis. The coating composition is applied to the steel and cured at a strip temperature of from about 250° F. (120° C.) to about 750° F. (400° C.) in air.

20 Claims, No Drawings

METHOD AND AQUEOUS COATING COMPOSITIONS FOR FORMING ANTI-STICK AND INSULATIVE COATINGS ON SEMI-PROCESSED AND FULLY-PROCESSED ELECTRICAL STEELS

TECHNICAL FIELD

The invention relates to a method and aqueous coating compositions for forming an anti-stick and insulative coating on semi-processed and fully-processed electrical steels, and more particularly to such a method and aqueous coating compositions involving an inorganic component and an organic component, providing the insulative qualities and enhanced punchability of an AISI Core Plate 3 coating, and the insulative qualities of an AISI Core Plate 5 coating before and after a stress relief anneal.

BACKGROUND ART

The method and coating compositions of the present invention are primarily directed to the provision of coatings for cold-rolled, non-oriented, fully-processed electrical steels and cold-rolled, non-oriented, semi-processed electrical steels. The term "cold-rolled, non-oriented, fully-processed electrical steels", as used herein and in the claims, is intended to refer to those electrical steels subjected at the mill to a quality anneal involving grain growth which may include decarburization to develop optimum magnetic properties. The term "cold-rolled, non-oriented, semi-processed electrical steels", as used herein and in the claims, is intended to refer to those electrical steels not given a quality anneal at the mill to fully develop magnetic properties. The customer may complete the processing by a quality anneal. This quality anneal involves grain growth and possibly decarburization (depending upon the amount of decarburization accomplished at the mill), essential to the development of optimum magnetic properties. Both semi-processed and fully-processed electrical steels, generally used for transformer, motor or generator laminations, are silicon steels. Nevertheless, the term "cold-rolled, non-oriented, semi-processed electrical steels" is intended to be inclusive of semi-processed carbon steels for motor laminations and the like.

The American Iron and Steel Institute publication "STEEL PRODUCTS MANUAL—ELECTRICAL STEELS", (January 1983, pp. 15–17), defines various insulative coatings for electrical steels and categorizes them as C-0, C-2, C-3, C-4 and C-5. A C-3 coating is an organic coating (usually a varnish or the like) designed for punchability. While resistant to normal operating temperatures up to 300° F. (185° C.), a C-3 coating will not provide adequate surface insulation after a stress relief anneal and may begin to deteriorate at temperatures above about 750° F. (400° C.). A C-5 coating is an inorganic insulative coating which will provide adequate surface insulation after a stress relief anneal. However, because it is inorganic, it does not have the punching qualities of a C-3 coating.

Fully-processed and semi-processed steels of the type defined above can be provided at the mill with an insulative coating. If the fully-processed laminations are not going to be annealed and, in service, will not be exposed to temperatures above 300° F. (185° C.), an organic or AISI Core Plate 3 coating can be utilized. In this application, the punching die wear and weldability characteristics of the coating can constitute important considerations. When the fully-processed laminations are stress relief annealed, the ability of the coating to provide adequate surface insulation after the anneal is important. A typical stress relief anneal is practiced at about 1400° F. (760° C.) to 1550° F. (843° C.) in an atmosphere which is non-oxidizing or neutral with respect to iron, such as 95% nitrogen and 5% hydrogen.

With respect to semi-processed steels, punching or the like is usually followed by a quality anneal (which also serves as a stress relief anneal) conducted in a decarburizing or neutral atmosphere containing components such as water vapor, hydrogen, nitrogen, hydrogen-nitrogen, or an atmosphere formed by partial combustion of gas. The quality anneal is usually conducted at a temperature within the range of from about 1400° F. (760° C.) to 1650° F. (900° C.). Under these circumstances, a Core Plate 3 coating cannot be used and a primary characteristic of the coating to be considered is its anti-stick characteristics. Additional characterstics often looked for is the coating's ability to prevent nitrogen pick-up and surface oxidation during a quality anneal, together with some rust protection for the laminations both prior to and after the quality anneal.

There are other factors which come into play with respect to such coatings. For example, motor manufacturers usually coat the motor windings with an epoxy or the like. In order to rebuild a motor and replace its windings, it is necessary to burn-off this epoxy coating. Such a burn-off anneal is usually conducted in air at a temperature above about 750° F. (400° C.). It is desirable that the coatings on the motor laminations provide adequate surface insulation after such a burn-off anneal.

Prior art workers have searched for a coating which could replace C-3 and C-5 coatings. In other words, a single coating which would have improved punchability compared to a C-5 coating, while being capable of providing adequate surface insulation after heat treatments at elevated temperatures.

Prior art workers have devised numerous inorganic-organic coatings for metal for various purposes. In fact, U.S. Pat. Nos. 3,908,066 and 3,839,256 teach coatings for providing electrical insulation when applied to electrical steel sheets for magnetic cores. The coating compositions taught therein consist of an organic portion comprising aqueous dispersions of copolymers, terpolymers or ionomers of ethylene and ethylunically-unsaturated carboxylic acids or esters blended with organic quaternary ammonium-silicate solutions. Nevertheless, to date there has not been developed an inorganic-organic coating capable of providing surface insulation after a stress relief anneal equivalent to a C-5 coating after a stress relief anneal.

U.S. Pat. Nos. 3,996,073 and 3,948,786 disclose insulative coatings which may be used in addition to or in place of a mill glass on electrical steels, such as cube-on-edge oriented silicon steel. The teachings of these patents are incorporated herein by reference. A coating solution, in accordance with these patents, contains aluminum, magnesium and phosphate in the following relative relationship on a water-free basis:

From 3% to 11% by weight $Al^{+++}$ calculated as $Al_2O_3$, from 3% to 15% by weight $Mg^{++}$ calculated as MgO, and from 78% to 87% by weight $H_2PO_4^-$ calculated as $H_3PO_4$, with the total weight percentage of $Al^{+++}$ (as $Al_2O_3$), $Mg^{++}$ (as MgO) and $H_2PO_4^-$ (as $H_3PO_4$) being 100% on a water-free basis. The concentration of $Al^{+++}$, $Mg^{++}$ and $H_2PO_4^-$ comprising 100 parts by weight calculated as aluminum oxide, magnesium oxide and phosphoric acid, respectively, on a water-free basis. In the embodiment of interest, colloidal silica is present within the range of 33 to 150 parts by weight on a water-free basis. At least 60% by weight of the coating solution must be water. From 10 to 25 parts by weight chromic anhydride for every 100 parts by weight $H_2PO_4^-$, calculated as $H_3PO_4$ are added in order to stabilize the colloidal silica and to provide satisfactory adherence, and lack of hygroscopicity and "tack" after curing at about 250° F. (120° C.) to about 350° F. (175° C.).

A commonly owned co-pending application, Ser. No. 06/612450, filed 5/21/84, in the name of Michael H. Haselkorn, and entitled "INSULATIVE COATING COMPOSITION FOR ELECTRICAL STEELS", teaches coating compositions similar to those set forth in U.S. Pat. Nos. 3,840,378 and 3,948,786, but in which both colloidal silica and chromic anhydride have been eliminated. The teachings of this co-pending application are incorporated herein by reference. Briefly, the coating solution contains aluminum, magnesium and phosphate in the same relative relationship as taught in the above noted U.S. Pat. Nos. 3,996,073 and 3,948,786 and enumerated above. In addition, the coating solutions contain aluminum silicate.

The present invention is based upon the discovery of a method and coating compositions for forming coatings having improved punchability compared to a C-5 coating, while being capable of providing adequate surface insulation after heat treatments at elevated temperatures. Such coatings are intended for use on cold-rolled, non-oriented fully-processed electrical steel, cold-rolled, non-oriented semi-processed electrical steel, and cold-rolled, non-oriented motor lamination steel. The coating compositions contain an inorganic portion and an organic portion. It has been found that the coating compositions taught in the above-mentioned U.S. Pat. Nos. 3,996,073 and 3,948,786 or the coating compositions taught in the above noted co-pending application can serve with excellent results as the inorganic portion of the coating compositions of the present invention. In addition to either of these inorganic portions, an organic portion is added, consisting essentially of a water soluble or dispersible resin containing by weight at least 40% water.

The coatings of the present invention are also particularly applicable to punching quality oriented electrical steel. Such steel is normally punched and stress relief annealed by the customer. During the manufacturing process, a mill glass is formed on the steel during the high temperature anneal in which the grain orientation is developed. The mill glass is removed by pickling since it would be harmful to punching dies. The steel manufacturer normally coats the pickled steel with a C-5 coating to provide surface insulation both before and after stress relief anneal, although such a coating is also somewhat harmful to punching dies. Application of the coatings of the present invention to such punching quality oriented electrical steel provides adequate insulation after stress relief annealing (similar to a C-5 coating) while providing improved punchability (similar to that of a C-3 coating).

DISCLOSURE OF THE INVENTION

According to the invention, there is provided a method and aqueous coating compositions for forming anti-stick and insulative coatings on cold-rolled, non-oriented, semi-processed steel; on cold-rolled, non-oriented, fully-processed steel; on cold-rolled motor lamination steel; and punching quality oriented electrical steel.

The coating compositions have an inorganic portion and an organic portion. The inorganic portion comprises, on a water-free basis and by weight, 3% to 11% $Al^{+++}$, 3% to 15% $Mg^{++}$, and 78% to 87% $H_2PO_4^-$ calculated as $Al_2O_3$, MgO and $H_3PO_4$, respectively, the total weight percentage thereof being 100% on a water-free basis. The concentration of $Al^{+++}$, $Mg^{++}$ and $H_2PO_4^-$ comprising 100 parts by weight calculated as $Al_2O_3$, MgO and $H_3PO_4$, respectively, on a water-free basis. The inorganic portion additionally may comprise colloidal silica or aluminum silicate. When colloidal silica is utilized, it is present in from 33 to 250 parts by weight on a water-free basis, together with from 10 to 25 parts by weight chromic anhydride for every 100 parts by weight $H_2PO_4^-$, calculated as $H_3PO_4$ and the inorganic portion should contain by weight at least 60% water. The range of colloidal silica is broader than that set forth in U.S. Pat. Nos. 3,948,786 and 3,996,073 because we are here concerned with insulative characteristics after stress relief annealing utilizing inorganic-organic coatings. When aluminum silicate is used, it should be present in from 30 to 250 parts by weight calculated as $Al_2O_3 \cdot SiO_2$ per 100 parts $Al_2O_3$, MgO and $H_3PO_4$ on a water-free basis and the inorganic portion should contain by weight at least 40% water.

The organic portion comprises a water soluble or dispersible resin containing by weight at least 40% water.

The inorganic and organic portions are combined so that the amount of the organic portion on a water free basis is from about 15 to about 1350 parts by weight per 100 parts $Al_2O_3$, MgO and $H_3PO_4$. The coating composition is applied to the steel and cured in air at a strip temperature of from about 250° F. to about 750° F. (120° C. to 400° C.).

DETAILED DESCRIPTION OF THE INVENTION

As indicated above, the aqueous coating compositions of the present invention have particular utility for use on cold-rolled, non-oriented, semi-processed steel; cold-rolled, non-oriented, fully-processed steel; cold-rolled motor lamination steel; and punching quality oriented silicon steel. The coatings produced from these coating compositions reduce punching and die wear problems while providing excellent electrical surface insulation characteristics for cold-rolled non-oriented fully-processed steel and oriented punching quality electrical steel, both prior to and after a stress relief anneal, if practiced. Similarly, these coatings provide excellent anti-stick characteristics during a quality anneal for cold-rolled non-oriented semi-processed steel and cold-rolled motor lamination steel, together with rust protection for the laminations.

The coatings of the present invention are inorganic-organic coatings and are characterized by certain application requirements and physical properties. With respect to application requirements, the coatings are water soluble or water dispersible; have a reasonable storage life; can be uniformly applied using grooved metering rolls or other conventional metering means; wet the surface of the steel; air cure in an open-flame gas furnace at a reasonably low temperature; are free of hazardous waste components; and are compatible with and impervious to transformer oils and the like.

With respect to physical properties, these coatings offer improved die wear during punching as compared to C-5 coatings; do not chip or flake during punching and/or slitting; bond well to cold-rolled, non-oriented, fully-processed and semi-processed steels and to oriented punching quality electrical steels; weld at reasonable speeds; are stable over a reasonable period of time after curing (non-hygroscopic); and provide electrical insulation at motor and transformer operating temperatures.

Additional physical properties of these coatings include the ability to provide electrical insulation at about 0.05–0.20 mil (1–5μ) thickness as cured; after a 30-minute burn-off anneal in air at about 1200° F. (650° C.); and after a stress relief anneal of one hour in a 95% nitrogen - 5% hydrogen dry atmosphere at a temperature of about 1500° F. (815° C.). Furthermore, such coatings, at a coating weight of less than 2 grams per square meter on each side of semi-processed steel, serve as anti-stick coatings during a quality anneal in a decarburizing or neutral atmosphere containing components such as water vapor, hydrogen, nitrogen, hydrogen-nitrogen, or an atmosphere formed by partial combustion of natural gas, at a temperature range of from about 1400° F. (760° C.) to 1650° F. (900° C.). In addition to preventing lamination sticking during such a quality anneal, the coatings also act as a nitrogen and oxygen diffusion barrier and offer some rust protection to the steel both prior to and after the quality anneal.

The coating compositions have an inorganic portion and an organic portion. The inorganic portion will first be discussed. The inorganic portion of the coating compositions may be substantially the same as the coating compositions taught in U.S. Pat. Nos. 3,996,073 and 3,948,786. Thus, the inorganic portion of the coating contains aluminum, magnesium and phosphate in the following relative relationship on a water-free basis:

From 3% to 11% by weight $Al^{+++}$ calculated as $Al_2O_3$, from 3% to 15% by weight $Mg^{++}$ calculated as MgO, and from 78% to 87% by weight $H_2PO_4^-$ calculated as $H_3PO_4$, with the total weight percentage of $Al^{+++}$, $Mg^{++}$ and $H_2PO_4^-$ comprising 100% calcualted as aluminum oxide, magnesium oxide and phosphoric acid, respectively, on a water-free basis. The concentration of $Al^{+++}$, $Mg^{++}$ and $H_2PO_4^-$ comprises 100 parts by weight calculated as $Al_2O_3$, MgO and $H_3PO_4$, respectively, on a water-free basis.

To the 100 parts by weight of aluminum, magnesium, and phosphate is added silica or silicates which provide the necessary electrical insulation qualities; enable the inorganic portion of the coating compositions to be cured at a lower temperature; and render the coatings non-tacky and non-hygroscopic. In a first embodiment, according to U.S. Pat. Nos. 3,996,073 and 3,948,786, colloidal silica can be used, but is preferably present within the range of 33 to 250 parts by weight on a water-free basis, together with from 10 to 25 parts by weight chromic anhydride for every 100 parts by weight $H_2PO_4^-$ calculated as $H_3PO_4$. In this particular embodiment of the inorganic portion of the coating solution of the present invention, at least 60% by weight of the inorganic portion must be water.

A second embodiment of the inorganic portion of the coating solution of the present invention may be substantially the same as the coating solution taught in the above noted co-pending application. In this embodiment, aluminum, magnesium and phosphate are in the same relative relationship on a water-free basis as described in U.S. Pat. Nos. 3,996,073 and 3,948,786. The difference lies in the fact that a silicate is used in place of the colloidal silica. Excellent results have been achieved with aluminum silicate. For purposes of an exemplary showing, the invention will be described in terms of the use of aluminum silicate, although it is not intended to be so limited. When aluminum silicate is used, it should be present in an amount of from about 30 parts to about 250 parts by weight per 100 parts $Al_2O_3$, MgO, and $H_3PO_4$, on a water-free basis. The composition of this embodiment of the inorganic portion should be at least 40% by weight water.

The term "aluminum silicate", as used herein and in the claims, refers to any clay which will react with phosphoric acid during curing. A general chemical composition for such a clay on a water-free basis may be stated as follows:

44% to 54% $SiO_2$
37% to 45% $Al_2O_3$
0.5% to 14% water of hydration (ignition loss)
Trace elements For example, a water-washed kaolin substantially free of sand, mica and water-soluble salts, having an average particle size of about 0.3 micron could be used. Kaolinite (naturate state) is conventionally designated as having a chemical formula of $Al_2(Si_2O_5)(OH)_4$. When processed, kaolin is conventionally designated as $Al_2O_3.SiO_2$, although the aluminum and silicon are combined as a complex and do not exist as free oxides.

Excellent results have been achieved through the use of aluminum silicate of the type sold by Engelhard Minerals and Chemicals Corporation, Edison, N.J., under the registered trademark ASP, Type 072. It is described by the manufacturer as being a water-washed kaolin processed to remove moisture, sand, mica and water-soluble salts. The product is non-hygroscopic, substantially inert and insoluble under normal conditions. Typical chemical composition is stated by the manufacturer to be as follows:

| | |
|---|---|
| Silicon (as $SiO_2$) | 45%–46% |
| Aluminum (as $Al_2O_3$) | 38%–39% |
| Iron (as $Fe_2O_3$) | up to 0.3% |
| Titanium (as $TiO_2$) | up to 1.5% |
| Calcium (as CaO) | up to 0.1% |
| Sodium (as $Na_2O$) | up to 0.1% |
| Potassium (as $K_2O$) | trace |
| Water of hydration (ignition loss) | 13%–14% |

Typical physical properties are as follows:

| | |
|---|---|
| Average particle size (microns) | 0.3 |
| Retained on 325 mesh (44 microns) | 0.01% max. |
| Oil absorption (ASTM DZ81-31) | 37–41 |
| pH | 6.3–7.0 |
| Bulk density (lb/ft$^3$) | |
| Loose | 42–46 |
| Firm | 52–56 |
| Free moisture | 1.0% max. |

There are a number of requirements which must be met by the organic portion of the coating composition of the present invention. The organic material must be water soluble or water dispersible, must be compatible with the inorganic portion, and should contain from 40% to 60% solids. Since both embodiments of the inorganic portion of the coating solution are acidic, a primary requirement for the organic material in the organic portion is that it be stable (i.e. does not gel) in an inorganic acid solution containing salts of metal phosphates. C-3 coatings, such as varnishes, are only stable in basic solutions. The organic portion must be capable of curing at a temperature below about 500° F. (260° C.) and preferably at a temperature of from about 250° F. to about 350° F. (120° C. to 175° C.).

Excellent results have been achieved when the organic portion of the coating solution comprises an aqueous resin suspension. Exemplary resin suspensions for this purpose are sold under the trademarks UC874 and UC130 by Union Carbide Corporation, Coating Materials Division, Milford, Ohio. UC874 is an aqueous acrylic resin suspension. UC130 is an aqueous vinyl acetate resin suspension. These constitute white liquids which contain approximately 40% to 60% solids and are stable in acidic solutions.

The organic portion of the coating composition should be present in an amount of from about 15 to about 1350 parts by weight per 100 parts $Al_2O_3$, MgO and $H_3PO_4$ on a water-free basis. If the organic content is greater than 1350 parts by weight per 100 parts aluminum-magnesium-phosphate, the coating composition is difficult to apply to the steel and displays poor insulative quality after a stress relief anneal or a burn-off operation. If the organic content is less than 15 parts by weight per 100 parts aluminum-magnesium-phosphate, punchability and die wear problems may occur and the coating becomes more difficult to cure. In addition, the surface insulation quality is not significantly improved over that achieved with organic contents of 15 parts or above. In the practice of the present invention, it has been found that an organic content of from about 25 to about 350 parts by weight per 100 parts aluminum-magnesium-phosphate is preferred and a range of organic contents from about 25 to about 170 parts by weight per 100 parts aluminum-magnesium-phosphate is more preferred.

After blending, the coating composition is diluted with water, if necessary, to produce the desired coating weight. This depends not only on the manner of application, but also on the ultimate purpose to be served by the coating. For example, if the coating is applied primarily to serve as an anti-stick coating following a quality anneal, a coating weight of less than 2 grams per square meter on each side of the steel may be desired. If the coating is applied primarily for its insulative qualities as cured, or following a stress relief anneal or a burn-off anneal, a coating thickness of from about 0.05 to about 0.20 mils (1–5μ) may be desired.

The coating solutions of the present invention may be applied in any suitable manner, including spraying, dipping or swabbing. Grooved metering rolls or doctor means can also be used. Once coated on the steel strip, the coating composition is cured in air at a strip temperature of from about 250° F. (120° C.) to about 750° F. (400° C.). Within this temperature range, complete curing occurs, producing uniform coatings with excellent physical appearance. At strip temperatures below about 250° F. (120° C.), curing is incomplete. When cured at a strip temperature greater than the above stated range, the organic portion of the coating may begin to char. It is believed that at the proper curing temperature, the coating composition forms an organic glass with the inorganic component incapsulated therein. At an elevated temperature such as is encountered during a stress relief anneal or a burn-off anneal, the organic glass decomposes and an inorganic glass is formed.

The coatings of the present invention wet better, flow better and adhere better than the usual C-5 coatings, while being capable of curing at a temperature as low as 250° F. (120° C.). The coatings demonstrate improved punchability, compared to a C-5 coating. In addition, the coatings of the present invention display a surface insulative quality after a stress relief anneal or a burn-off anneal similar to that of a C-5 coating.

EXAMPLE 1

In a laboratory trial, cold-rolled, non-oriented steel samples were coated with coating compositions of the present invention wherein the organic portion comprised an aqueous resin suspension utilizing UC130 vinyl acetate resin. The inorganic portion of the coatings comprised the above noted aluminum-magnesium-phosphate system containing chromic anhydride and colloidal silica. Two different inorganic portions were used. One portion, hereinafter designated inorganic I, contained one part by volume aluminum-magnesium-phosphate system and one part by volume colloidal silica (34%). On a water-free basis, inorganic I contained 25 parts by weight chromic anhydride per 100 parts $H_3PO_4$ and 88 parts by weight $SiO_2$ per 100 parts $Al_2O_3$, MgO and $H_3PO_4$. The other inorganic portion, hereinafter designated inorganic II, contained one part by volume aluminum-magnesium-phosphate system and two parts by volume colloidal silica (34%). On a water-free basis, inorganic II contained 25 parts by weight chromic anhydride per 100 parts $H_3PO_4$ and 176 parts by weight $SiO_2$ per 100 parts $Al_2O_3$, MgO and $H_3PO_4$. Inorganic I and inorganic II were mixed with UC130 (the UC130 having been diluted to a specific gravity of 1.03) in volume ratios of 3:1, 1:1 and 1:3. The composition of each inorganic-organic blend, on a water-free basis, is shown in Table I. Each coating was applied at a thickness which provided, after curing, Franklin Resistivities of approximately 0.2 amps. The coatings were cured in air at a strip temperature of 700° F. (370° C.). The samples were then subjected to a one-hour stress relief anneal at 1500° F. (815° C.) in an atmosphere of 95% nitrogen, 5% hydrogen. The Franklin Resistivities, before and after the stress relief anneal for each coating composition, are listed in Table I, below.

TABLE I

| Volume Ratio of Inorganic to Organic | Specific Gravity | Organic Content* | Franklin Resistivity (Amps) Before SRA | After SRA |
|---|---|---|---|---|
| 3 parts inorganic I/ 1 part organic | 1.30 | 25 | .092 | .327 |
| 1 part inorganic I/ 1 part organic | 1.18 | 76 | .140 | .697 |
| 1 part inorganic I/ 3 parts organic | 1.12 | 228 | .180 | .959 |
| 3 parts inorganic II/ 1 part organic | 1.25** | 38 | .118 | .294 |
| 1 part inorganic II/ 1 part organic | 1.19 | 114 | .209 | .533 |
| 1 part inorganic II/ 3 parts organic | 1.10 | 342 | .287 | .929 |

*Parts by weight organic per 100 parts $Al_2O_3$, MgO and $H_3PO_4$ on a water-free basis.
**Reduced specific gravity by adding 100 ml distilled $H_2O$ to solution, otherwise specific gravity too great for coating.

This laboratory trial demonstrated that the inorganic-organic blends, if cured properly, developed coatings which bonded well to a cold-rolled, non-oriented steel, demonstrating acceptable stability and physical appearance after curing.

Increasing the inorganic portion of the inorganic I/organic blend or the inorganic II/organic blend increased the specific gravity of the coating solution. With this increase in specific gravity, thicker coatings were obtained and, for this reason, increasing the inorganic portion of the blends produced improved Franklin Resistivities prior to the stress relief anneal. Improved Franklin Resistivities were obtained after the stress relief anneal with the increased inorganic content. All of the blends bonded well to the cold-rolled non-oriented samples after the stress relief anneal.

Increasing the colloidal silica content (i.e., those coatings containing inorganic II), resulted in improved Franklin Resistivities after the stress relief anneal.

EXAMPLE 2

In a second laboratory trial, inorganic-organic coating compositions were made up in volume ratios of 3:1, 2:1, 1:1, 1:2 and 1:3. In the coating compositions, the inorganic portion comprised the aluminum-magnesium-phosphate system without chromic anhydride, plus 104 parts by weight aluminum silicate (ASP072) per 100 parts $Al_2O_3$, MgO and $H_3PO_4$ on a water-free basis. The organic portions comprised aqueous vinyl acetate resin suspensions. Table II contains the compositions of each inorganic-organic blend on a water-free basis.

It was determined that when the organic portion of the coating was greater than about 304 parts by weight per 100 parts aluminum-magnesium-phosphate system, on a water-free basis, the coatings were more difficult to cure. When removed from the drying oven after heating the coated cold-rolled, non-oriented metallic samples to 250° F. (120° C.), those coatings containing 608 and 912 parts organic by weight had a clear, shiny, physical appearance and were tacky. Upon cooling, however, these coatings changed to a dark brown, mat, physical appearance and were not tacky. The coatings containing 304 parts by weight or less of the organic component per 100 parts $Al_2O_3$, MgO and $H_3PO_4$ (i.e., the first three coatings in Table II) were not tacky when removed from the drying oven. Increasing the inorganic volume ratio changed the physical appearance of these coatings after curing from a light brown, mat physical appearance to a charcoal gray shiny physical appearance. Irrespective of the inorganic to organic ratio, after curing, all of the coating compositions bonded extremely well to the surfaces of the cold-rolled, non-oriented steel samples.

All of the samples were subjected to a one-hour laboratory stress relief anneal at 1500° F. (815° C.) in a dry 95% nitrogen, 5% hydrogen atmosphere. Table II contains the coating thicknesses and Franklin Resistivities for each coating composition after curing and after the laboratory stress relief anneal.

TABLE II

| Volume Ratio of Inorganic to Organic | Organic Content* | Coating Thickness (Mils) | Franklin Resistivity (Amps) | |
|---|---|---|---|---|
| | | | Before SRA | After SRA |
| 3:1 | 101 | .08 | 0 | .638 |
| 2:1 | 152 | .08 | 0 | .738 |
| 1:1 | 304 | .15 | 0 | .846 |
| 1:2 | 608 | .21 | 0 | .861 |
| 1:3 | 912 | .24 | 0 | .923 |

*Parts by weight per 100 parts $Al_2O_3$, MgO and $H_3PO_4$ on a water-free basis.

After the stress relief anneal, all of the coatings bonded well to the surface of the cold-rolled non-oriented steel samples and had a black, relatively shiny physical appearance. Improved Franklin Resistivities were achieved after the laboratory stress relief anneal by increasing the inorganic portion of coating composition.

This laboratory trial illustrates that aluminum silicate additions can be substituted for the colloidal silica in the inorganic-organic blend without adversely affecting the curing characteristics, the surface insulation properties before or after a laboratory stress relief anneal, or the physical appearance of the coating. Substituting the hydrous aluminum silicate for the colloidal silica in these coating compositions also enables the elimination of chromic anhydride therefrom.

EXAMPLE 3

A third laboratory trial was directed to the optimization of the inorganic-organic blend by studying the effect of changing both the inorganic portion and the organic content. To accomplish this, four inorganic portions were mixed. Each of the four inorganic portions contained the aluminum-magnesium-phosphate system without chromic anhydride, plus aluminum silicate (ASP072). The four inorganic portions differed from each other in that they contained, respectively, 52, 104, 156 and 207 parts by weight aluminum silicate per 100 parts of $Al_2O_3$, MgO and $H_3PO_4$ on a water-free basis. Each of these inorganic portions was then mixed in volume ratios of 3:1, 2:1 and 1:1 with the vinyl acetate resin suspension UC130. The composition of each coating on a water-free basis is shown in Table III.

All of the coatings were diluted with distilled water to 1.15 to 1.20 specific gravities after blending, applied to cold-rolled non-oriented samples, and cured at 250° F. (120° C.). The samples were subjected to a one-hour laboratory stress relief anneal at 1500° F. (815° C.) in a dry atmosphere of 95% nitrogen, 5% hydrogen.

In addition, samples of the 2:1 and 3:1 blends made from those coating compositions having an inorganic portion containing 156 and 207 parts by weight aluminum silicate per 100 parts $Al_2O_3$, MgO and $H_3PO_4$ were subjected to burn-off anneals. The burn-off anneals comprised one-hour anneals in air at both 900° F. (480° C.) and 1100° F. (595° C.).

Table III, below, lists the Franklin Resistivities of the coatings as coated and after the laboratory stress relief anneal at 1500° F. (815° C.).

TABLE III

| Aluminum Silicate in Inorganic Portion* | Volume Ratio of Inorganic to Organic | Specific Gravity | Amount of Organic Component** | Franklin Resistivity (Amps)*** | |
|---|---|---|---|---|---|
| | | | | As Coated | SRA |
| 52 | 3:1 | 1.20 | 97 | 0 | .43 |
| | 2:1 | 1.20 | 146 | 0 | .45 |
| | 1:1 | 1.20 | 291 | 0 | .54 |

TABLE III-continued

| Aluminum Silicate in Inorganic Portion* | Volume Ratio of Inorganic to Organic | Specific Gravity | Amount of Organic Component** | Franklin Resistivity (Amps)*** | |
|---|---|---|---|---|---|
| | | | | As Coated | SRA |
| 104 | 3:1 | 1.20 | 102 | 0 | .46 |
| | 2:1 | 1.20 | 152 | 0 | .36 |
| | 1:1 | 1.20 | 305 | 0 | .50 |
| 156 | 3:1 | 1.20 | 106 | 0 | .36 |
| | 2:1 | 1.20 | 159 | 0 | .38 |
| | 1:1 | 1.20 | 318 | 0 | .56 |
| 207 | 3:1 | 1.15 | 111 | 0 | .30 |
| | 2:1 | 1.15 | 166 | 0 | .50 |
| | 1:1 | 1.15 | 332 | 0 | .62 |

*Parts by weight per 100 parts $Al_2O_3$, MgO and $H_3PO_4$ on a water-free basis.
**Parts by weight per 100 parts $Al_2O_3$, MgO and $H_3PO_4$ on a water-free basis.
***Average of 8 tests.

Table IV sets forth the Franklin Resistivity after the 900° F. (480° C.) burn-off anneal and after the 1100° F. (595° C.) burn-off anneal.

TABLE IV

| Aluminum Silicate in Inorganic Portion* | Volume Ratio of Inorganic to Organic | Specific Gravity | Amount of Organic Component | Franklin Resistivity (Amps) | |
|---|---|---|---|---|---|
| | | | | After 900° F. Burn-Off Anneal | After 1100° F. Burn-Off Anneal |
| 156 | 3:1 | 1.20 | 106 | .02 | .21 |
| | 2:1 | 1.20 | 159 | .02 | .10 |
| 207 | 3:1 | 1.20 | 111 | .03 | .30 |
| | 2:1 | 1.20 | 166 | 0 | .03 |
| 207 | 3:1 | 1.15 | 111 | .03 | .10 |
| | 2:1 | 1.15 | 166 | .07 | .30 |

*Parts by weight per 100 parts $Al_2O_3$, MgO and $H_3PO_4$ on a water-free basis.

This laboratory trial illustrates that changing the ASP072 content of the blends at any of the inorganic-to-organic ratios did not change the curing characteristics of the blends or their physical appearance after curing. Increasing the inorganic portion of the blends also had little effect on the curing characteristics of the coatings. However, increasing the inorganic-to-organic ratio changed the physical appearance of these coatings after curing from light brown and mat to charcoal gray and shiny. Increasing the inorganic portion also produced glossier coatings after the laboratory stress relief anneal. Slightly thinner coatings were obtained in this laboratory trial than in the previously described laboratory trial. This is true because increasing the inorganic portion of the coatings reduced the specific gravity of the coating solutions.

The Franklin Resistivity results listed in Table III indicate that increasing the volume ratio of the inorganic portion to the organic portion will produce a coating with improved Franklin Resistivity after a laboratory stress relief anneal. Increasing the aluminum silicate (ASP072) content also improves the Franklin Resistivities of these inorganic-organic coatings after a laboratory stress relief anneal, but to a lesser extent. For these reasons, in this laboratory trial, the best Franklin Resistivities after the laboratory stress relief anneal were produced by the 3:1 inorganic to organic blends containing either 156 or 207 parts by weight aluminum silicate (ASP072) per 100 parts $Al_2O_3$, MgO and $H_3PO_4$ on a water-free basis. The good Franklin Resistivities for the 2:1 inorganic-organic plus 156 parts by weight aluminum silicate (ASP072) per 100 parts $Al_2O_3$, MgO and $H_3PO_4$ on a water-free basis occurred because this coating was applied at 0.17 mils (4μ), or 0.03 to 0.04 mils (about 1μ) thicker than the other coatings in this program. A metallographic analysis revealed that increasing either the inorganic portion, or the amount of ASP072 in the blend, caused less coating deterioration to occur during the laboratory stress relief anneal.

Table IV demonstrates that a 900° F. (480° C.) burn-off anneal did not significantly change the surface insulative properties of any of the coating compositions. Slightly poorer (0.1–0.3 Amps) Franklin Resistivities were obtained after the 1100° F. (595° C.) burn-off. After both burn-off anneals, the inorganic-organic coatings had a white physical appearance.

In summary, it has been found that using an aluminum silicate, instead of colloidal silica, produces a more stable coating composition having improved physical appearance and surface insulating properties, both prior to and after a laboratory stress relief anneal. Furthermore, chromic anhydride can be eliminated when aluminum silicate is used. Therefore, the use of aluminum silicate is preferred. It has further been found that an aqueous vinyl acetate resin suspension (UC130) is more easily cured and, therefore, preferred over an aqueous acrylic resin suspension, such as UC874.

EXAMPLE 4

In a plant trial, four 26-gauge cold-rolled, fully-processed coils were coated with a coating of the present invention having an inorganic portion to organic portion volume ratio of 3:1. The inorganic portion of the coating consisted of the aluminum-magnesium-phosphate system without chromic anhydride, together with 62 parts by weight aluminum silicate (ASP072) per 100 parts $Al_2O_3$, MgO and $H_3PO_4$ on a water-free basis. The organic portion was an aqueous suspension of a vinyl acetate resin (UC130) and comprised approximately 98 parts by weight per 100 parts $Al_2O_3$, MgO, and $H_3PO_4$, on a water-free basis.

Running the line between 110 and 135 feet per minute (33 and 41 meters per minute), the coating wet the strip well, producing smooth even coatings on both strip surfaces. At a strip temperature of 550° F. to 600° F. (290° C. to 315° C.), the coating was completely cured, had a gray-green physical appearance, and was relatively shiny. As coated and cured, the coating had a Franklin Resistivity of 0.025 Amps. Coating thicknesses ranged between 0.12 and 0.18 mils (3 and 4.5μ).

Coil samples were sheared into 5-inch (12.7 cm) by 12-inch (30.5 cm) blanks and groups thereof were subjected to a burn-off anneal for one hour in air at 900° F. (480° C.); a burn-off anneal for one hour in air at 1100° F. (595° C.); and a stress relief anneal for one hour at 1500° F. (815° C.) in a dry atmosphere of 95% nitrogen and 5% hydrogen. In an average of six tests each, the coating demonstrated a Franklin Resistivity of 0.010 amp after burn-off at 900° F. (480° C.), a Franklin Resistivity after a burn-off at 1100° F. (595° C.) of 0.005 amp and a Franklin Resistivity after the stress relief anneal of 0.633 amp.

Thus it will be seen that this coating of the present invention provided excellent insulative properties after the burn-off anneal. Some coating deterioration occurred during the laboratory stress relief anneal. However, if improved insulative properties are required after a stress relief anneal, the content of the aluminum silicate could be increased. It is to be remembered that increasing the aluminum silicate content will, to some extent, reduce the punching properties of the coating.

Modifications may be made in the invention without departing from the spirit of it. For example, it would be within the scope of the invention to provide an inorganic portion comprising a combination of silicas, silicates, or silica and silicate.

What is claimed is:

1. An aqueous coating composition for forming an anti-stick and insulative coating on cold-rolled, non-oriented, semi-processed steel; cold-rolled, non-oriented, fully-processed steel; cold-rolled motor lamination steel; and punching quality oriented electrical steel, said coating composition having an inorganic portion and an organic portion, said inorganic portion comprising, on a water-free basis, from 3% to 11% by weight $Al^{+++}$ calculated as $Al_2O_3$, from 3% to 15% by weight $Mg^{++}$ calculated as $MgO$, from 78% to 87% by weight $H_2PO_4^-$ calculated as $H_3PO_4$, the total weight percentage of $Al^{+++}$ (as $Al_2O_3$), $Mg^{++}$ (as $MgO$) and $H_2PO_4^-$ (as $H_3PO_4$) being 100% on a water-free basis, said concentration of $Al^{+++}$, $Mg^{++}$ and $H_2PO_4^-$ totaling 100 parts by weight on a water-free basis calculated as $Al_2O_3$, $MgO$ and $H_3PO_4$, respectively, and an additional compound chosen from the class consisting of (1) from 33 to 250 parts by weight colloidal silica on a water-free basis, together with from 10 to 25 parts by weight chromic anhydride for every 100 parts by weight $H_2PO_4^-$ calculated as $H_3PO_4$, and (2) from 30 to 250 parts by weight aluminum silicate calculated as $Al_2O_3 \cdot SiO_2$ per 100 parts $Al_2O_3$, $MgO$ and $H_3PO_4$ on a water-free basis, said inorganic portion containing by weight at least 60% water when colloidal silica is used and at least 40% water when aluminum silicate is used, said organic portion comprising an aqueous resin containing by weight at least 40% water, said organic and inorganic portions being combined so that the organic portion of the coating composition is present in an amount of from about 15 to about 1350 parts by weight per 100 parts $Al_2O_3$, $MgO$ and $H_3PO_4$ on a water-free basis.

2. The coating composition claimed in claim 1, wherein said organic and inorganic portions are combined so that the organic portion of the coating composition is present in an amount of from about 25 to about 350 parts by weight per 100 parts $Al_2O_3$, $MgO$ and $H_3PO_4$ on a water-free basis.

3. The coating composition claimed in claim 1, wherein said organic and inorganic portions are combined so that the organic portion of the coating composition is present in an amount of from about 25 to about 170 parts by weight per 100 parts $Al_2O_3$, $MgO$ and $H_3PO_4$ on a water-free basis.

4. The coating composition claimed in claim 1, wherein said aluminum silicate comprises a water washed kaolin substantially free of sand, mica and water soluble salts, having an average particle size of about 0.03 micron.

5. The coating composition claimed in claim 1, wherein said resin is an acrylic resin.

6. The coating composition claimed in claim 1, wherein said resin is a vinyl acetate resin.

7. The coating composition claimed in claim 4, wherein said additional compound is said aluminum silicate.

8. The coating composition claimed in claim 7, wherein said resin is a vinyl acetate resin.

9. The coating composition claimed in claim 8, wherein said organic and inorganic portions are combined so that the organic portion of the coating composition is present in an amount of from about 25 to about 350 parts by weight per 100 parts $Al_2O_3$, $MgO$ and $H_3PO_4$ on a water-free basis.

10. The coating composition claimed in claim 8, wherein said organic and inorganic portions are combined so that the organic portion of the coating composition is present in an amount of from about 25 to about 170 parts by weight per 100 parts $Al_2O_3$, $MgO$ and $H_3PO_4$ on a water-free basis.

11. A method of providing an anti-stick and insulative coating on cold-rolled, non-oriented, semi-processed steel; cold-rolled, non-oriented, fully-processed steel; cold-rolled motor lamination steel; and punching quality oriented electrical steel, comprising the steps of formulating an aqueous coating composition having an inorganic portion and an organic portion, said inorganic portion comprising, on a water-free basis, from 3% to 11% by weight $Al^{+++}$ calculated as $Al_2O_3$, from 3% to 15% by weight $Mg^{++}$ calculated as $MgO$, and from 78% to 87% parts by weight $H_2PO_4^-$ calculated as $H_3PO_4$, the total weight percentage of said $Al^{+++}$ (as $Al_2O_3$), $Mg^{++}$ (as $MgO$) and $H_2PO_4^-$ (as $H_3PO_4$) being 100% on a water-free basis, said concentration at $Al^{+++}$, $Mg^{++}$ and $H_2PO_4^-$ totalling 100 parts by weight on a water-free basis calculated as $Al_2O_3$, $MgO$ and $H_3PO_4$, respectively, and an additional compound chosen from the class consisting of (1) from 33 to 250 parts by weight colloidal silica on a water-free basis, together with from 10 to 25 parts by weight chromic anhydride for every 100 parts by weight $H_2PO_4^-$ calculated as $H_3PO_4$, and (2) from 30 to 250 parts by weight aluminum silicate calculated as $Al_2O_3 \cdot SiO_2$ per 100 parts $Al_2O_3$, $MgO$ and $H_3PO_4$ on a water-free basis, said inorganic portion containing by weight at least 60% water when colloidal silica is used and at least 40% water when aluminum silicate is used, said organic portion comprising an aqueous resin containing by weight at least 40% water, combining said inorganic and organic portions so that the organic portion of the coating composition is present in an amount of from about 15 to about 1350 parts by weight per 100 parts $Al_2O_3$, $MgO$ and $H_3PO_4$ on a water-free basis, applying said coating composition to said steel, and curing said coating at a temperature of from 250° F. (120° C.) to 750° F. (400° C.) in air.

12. The method claimed in claim 11, including the step of combining said organic and inorganic portions so that the organic portion of the coating composition is present in an amount of from about 25 to about 350 parts by weight per 100 parts $Al_2O_3$, $MgO$ and $H_3PO_4$ on a water-free basis.

13. The method claimed in claim 11, including the step of combining said organic and inorganic portions so that the organic portion of the coating composition is present in an amount of from about 25 to about 170 parts by weight per 100 parts $Al_2O_3$, $MgO$ and $H_3PO_4$ on a water-free basis.

14. The method claimed in claim 11, wherein said aluminum silicate comprises a water washed kaolin substantially free of sand, mica and water soluble salts, having an average particle size of about 0.03 micron.

15. The method claimed in claim 11, wherein said resin is an acrylic resin.

16. The method claimed in claim 11, wherein said resin is a vinyl acetate resin.

17. The method claimed in claim 14, wherein said additional compound is said aluminum silicate.

18. The method claimed in claim 17, wherein said resin is a vinyl acetate resin.

19. The method claimed in claim 18, including the step of combining said organic and inorganic portions so that the organic portion of the coating composition is present in an amount of from about 25 to about 350 parts by weight per 100 parts $Al_2O_3$, MgO and $H_3PO_4$ on a water-free basis.

20. The method claimed in claim 18, including the step of combining said organic and inorganic portions so that the organic portion of the coating composition is present in an amount of from about 25 to about 170 parts by weight per 100 parts $Al_2O_3$, MgO and $H_3PO_4$ on a water-free basis.

* * * * *